United States Patent
Zhang et al.

(10) Patent No.: US 10,162,515 B2
(45) Date of Patent: Dec. 25, 2018

(54) METHOD AND ELECTRONIC DEVICE FOR CONTROLLING DISPLAY OBJECTS ON A TOUCH DISPLAY BASED ON A TOUCH DIRECTIONAL TOUCH OPERATION THAT BOTH SELECTS AND EXECUTES A FUNCTION

(71) Applicants: Beijing Lenovo Software Ltd., Beijing (CN); Lenovo (Beijing) Limited, Beijing (CN)

(72) Inventors: Xiaoping Zhang, Beijing (CN); Qingdi Xie, Beijing (CN); Xueyuan Zhang, Beijing (CN); Qiang Yao, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 147 days.

(21) Appl. No.: 14/858,332

(22) Filed: Sep. 18, 2015

(65) Prior Publication Data

US 2016/0349982 A1  Dec. 1, 2016

(30) Foreign Application Priority Data

May 26, 2015 (CN) .......................... 2015 1 0275191

(51) Int. Cl.
  *G06F 3/0484* (2013.01)
  *G06F 3/0488* (2013.01)
(52) U.S. Cl.
  CPC ...... *G06F 3/04883* (2013.01); *G06F 3/04842* (2013.01)

(58) Field of Classification Search
  CPC . G06F 3/0482; G06F 3/04842; G06F 3/04883
  See application file for complete search history.

(56) References Cited

U.S. PATENT DOCUMENTS

| | | | |
|---|---|---|---|
| 2011/0163944 A1* | 7/2011 | Bilbrey | G01D 21/02 345/156 |
| 2011/0258537 A1* | 10/2011 | Rives | G06F 3/04883 715/255 |
| 2012/0188164 A1* | 7/2012 | Dey | G06F 3/017 345/163 |
| 2013/0167019 A1* | 6/2013 | Wadayama | G06F 3/0483 715/251 |

(Continued)

OTHER PUBLICATIONS

"German Application Serial No. 10 2015 117 659.9, Office Action dated Feb. 28, 2018", w/English Translation, (dated Feb. 28, 2018), 15 pgs.

*Primary Examiner* — Ryan A Lubit
(74) *Attorney, Agent, or Firm* — Schwegman Lundberg & Woessner, P.A.

(57) ABSTRACT

The present disclosure discloses an information processing method and an electronic device. The method comprises: detecting and acquiring a first touch operation on a touch display unit of the electronic device when M display objects are displayed on the touch display unit, wherein M is an integer greater than or equal to 1; and controlling N of the M display objects to be in a selected state in response to the first touch operation, and generating and executing a first operation instruction for implementing a first operation on the N display objects, wherein N is a positive integer less than or equal to M.

13 Claims, 7 Drawing Sheets

A first touch operation on a touch display unit of the electronic device is detected and acquired when M display objects are displayed on the touch display unit, wherein M is an integer greater than or equal to 1 — S101

N of the M display objects are controlled to be in a selected state in response to the first touch operation, and a first operation instruction for implementing a first operation on the N display objects is generated and executed, wherein N is a positive integer less than or equal to M — S102

(56) References Cited

U.S. PATENT DOCUMENTS

| | | | |
|---|---|---|---|
| 2014/0109004 A1 | 4/2014 | Sadhvani et al. | |
| 2014/0123049 A1* | 5/2014 | Buxton | G06F 3/04886 715/773 |
| 2014/0223345 A1* | 8/2014 | Tetali | G06F 3/0482 715/769 |
| 2014/0325410 A1* | 10/2014 | Jung | G06F 3/0488 715/765 |
| 2015/0135112 A1 | 5/2015 | Huang et al. | |
| 2016/0070460 A1* | 3/2016 | Gradert | G06F 3/04883 715/771 |
| 2016/0117141 A1* | 4/2016 | Ro | G06F 3/1454 715/748 |
| 2017/0147199 A1* | 5/2017 | Son | H04W 4/21 |

* cited by examiner

METHOD AND ELECTRONIC DEVICE FOR CONTROLLING DISPLAY OBJECTS ON A TOUCH DISPLAY BASED ON A TOUCH DIRECTIONAL TOUCH OPERATION THAT BOTH SELECTS AND EXECUTES A FUNCTION

CROSS-REFERENCE TO RELATED APPLICATION(S)

This application claims priority to the Chinese Patent Application No. 201510275191.7, filed on May 26, 2015, entitled "INFORMATION PROCESSING METHOD AND ELECTRONIC DEVICE" which is incorporated herein by reference in its entirety.

TECHNICAL FIELD

The present disclosure relates to the field of electronic technology, and more particularly, to an information processing method and an electronic device.

BACKGROUND

With continuous development of science and technology, there are also increasing types and functions of electronics, and the electronics gradually become necessities of people's life.

Conventionally, when a user edits display objects on a touch screen of an electronic device with a stylus, and wants to implement a copy operation on some of the display objects, for example, some of characters in a text object, the user firstly needs to select a required text by dragging the stylus, and then lift up the stylus. In this case, an operation menu comprising "copy", "cut", "paste" and "delete" appears on the touch screen of the electronic device. Then, the user clicks on the touch screen again with the stylus to select "copy" in the operation menu. Then, a text selected by the user is copied by the electronic device, and is stored in a clipboard of the electronic device for use by the user.

The inventor of the present disclosure discovers the following technical problem in the related art in the process of implementing the technical solutions according to the embodiments of the present disclosure:

As it needs to achieve the purpose of edition by implementing multiple operations such as an object selection operation, an edition operation or the like when the user needs to edit the display objects of the electronic device, there is a technical problem in the related art that the operation is complex and the efficiency is low when there is a need to select and edit some of multiple objects in the electronic device.

SUMMARY

Embodiments of the present disclosure provide an information processing method and an electronic device to select and edit some of multiple objects in the electronic device, thereby simplifying the operation and improving the efficiency in the operation.

According to a first aspect of the present disclosure, an information processing method is provided, comprising:

detecting and acquiring a first touch operation on a touch display unit of an electronic device when M display objects are displayed on the touch display unit, wherein M is an integer greater than or equal to 1; and controlling N of the M display objects to be in a selected state in response to the first touch operation, and generating and executing a first operation instruction for implementing a first operation on the N display objects, wherein N is a positive integer less than or equal to M.

In a possible implementation, the first touch operation is a touch operation implemented by an operation body on the touch display unit, and the operation body is a finger of a user or a stylus.

In a possible implementation, controlling N of the M display objects to be in a selected state in response to the first touch operation comprises:

acquiring a touch start point and a touch end point of the first touch operation in response to the first touch operation;

determining a first touch trajectory of the first touch operation based on the touch start point and the touch end point;

determining the N display objects from the M display objects based on the first touch trajectory; and controlling the N display objects to be in the selected state.

In a possible implementation, controlling the N display objects to be in the selected state comprises:

acquiring touch duration in which the operation body keeps in a contact state with the touch display unit at the touch end point;

detecting whether the touch duration is greater than or equal to predetermined duration to acquire a detection result; and controlling the N display units to be in the selected state when the detection result is yes.

In a possible implementation, determining a first touch trajectory of the first touch operation based on the touch start point and the touch end point comprises:

judging whether the touch start point is the same as the touch end point and there is another touch point between the touch start point and the touch end point to acquire a judgment result;

determining that the touch trajectory of the first touch operation is a closed touch trajectory having a first closed region on the touch display unit when the judgment result is yes; and determining that the touch trajectory of the first touch operation is a non-closed touch trajectory when the judgment result is no.

In a possible implementation, determining the N display objects from the M display objects based on the first touch trajectory comprises:

determining the N display objects from the M display objects, wherein the N display objects at least comprise at least one of the M display objects which is located in the first closed region; or determining that at least one of the M display objects which is on the non-closed touch trajectory belongs to the N display objects.

In a possible implementation, when the first touch trajectory is the closed touch trajectory, generating and executing a first operation instruction for implementing a first operation on the N display objects comprises:

acquiring a first touch direction of the first touch operation; and generating and executing the first operation instruction for implementing a first operation on the N display objects at least based on the first touch direction.

In a possible implementation, when the first touch trajectory is the non-closed touch trajectory, generating and executing a first operation instruction for implementing a first operation on the N display objects comprises:

generating and executing the first operation instruction for implementing a first operation on the N display objects based on the non-closed touch trajectory.

In a possible implementation, the first operation instruction is:

a deletion instruction of deleting the N display objects; or a copy instruction of copying the N display objects; or a cut instruction of cutting the N display objects; or a share instruction of sharing the N display objects; or a selected state canceling instruction of canceling the selected state of the N display objects.

In a possible implementation, the M objects are file objects and/or application objects displayed on the touch display unit; or the M objects are characters and/or symbols displayed on the touch display unit after a text file is opened through a text application.

According to another aspect of the present disclosure, an electronic device is provided, comprising:

a housing;

a touch display unit arranged in the housing; and a processor arranged in the housing and comprising hardware configured to detect and acquire a first touch operation on the touch display unit of the electronic device when M display objects are displayed on the touch display unit, wherein M is an integer greater than or equal to 1, control N of the M display objects to be in a selected state in response to the first touch operation, and generate and execute a first operation instruction for implementing a first operation on the N display objects, wherein N is a positive integer less than or equal to M.

In a possible implementation, the hardware is further configured to:

acquire a touch start point and a touch end point of the first touch operation in response to the first touch operation;

determine a first touch trajectory of the first touch operation based on the touch start point and the touch end point;

determine the N display objects from the M display objects based on the first touch trajectory; and control the N display objects to be in the selected state.

In a possible implementation, the hardware is further configured to:

acquire touch duration in which the operation body keeps in a contact state with the touch display unit at the touch end point;

detect whether the touch duration is greater than or equal to predetermined duration to acquire a detection result; and control the N display units to be in the selected state when the detection result is yes.

In a possible implementation, the hardware is further configured to:

judge whether the touch start point is the same as the touch end point and there is another touch point between the touch start point and the touch end point to acquire a judgment result;

determine that the touch trajectory of the first touch operation is a closed touch trajectory having a first closed region on the touch display unit when the judgment result is yes; and determine that the touch trajectory of the first touch operation is a non-closed touch trajectory when the judgment result is no.

In a possible implementation, the hardware is further configured to:

determine the N display units from the M display objects, wherein the N display objects at least comprise at least one of the M display objects which is located in the first closed region; or determine that at least one of the M display objects which is on the non-closed touch trajectory belongs to the N display objects.

In a possible implementation, the hardware is further configured to:

acquire a first touch direction of the first touch operation; and generate and execute the first operation instruction for implementing a first operation on the N display objects at least based on the first touch direction.

In a possible implementation, the hardware is further configured to:

generate and execute the first operation instruction for implementing a first operation on the N display objects based on the non-closed touch trajectory.

According to another aspect of the present application, an electronic device is further provided, comprising:

a first detection unit configured to detect and acquire a first touch operation on a touch display unit of the electronic device when M display objects are displayed on the touch display unit, wherein M is an integer greater than or equal to 1; and a first control unit configured to control N of the M display objects to be in a selected state in response to the first touch operation, and generate and execute a first operation instruction for implementing a first operation on the N display objects, wherein N is a positive integer less than or equal to M.

According to the embodiments of the present disclosure, the technical measure comprises detecting and acquiring a first touch operation on a touch display unit of the electronic device when M display objects are displayed on the touch display unit, controlling N of the M display objects to be in a selected state in response to the first touch operation, and generating and executing a first operation instruction for implementing a first operation on the N display objects. In this way, when a touch operation is detected by the electronic device, the electronic device can not only select objects corresponding to the touch operation based on the touch operation, but also can implement other operations on the selected objects based on the first operation. This simplifies the operation and improves the efficiency in the operation.

In addition, according to the embodiments of the present disclosure, the technical measure comprises acquiring a first touch direction of the first touch operation and generating and executing the first operation instruction for implementing a first operation on the N display objects at least based on the first touch direction. In this way, the electronic device can generate multiple operation instructions according to different touch directions, so as to satisfy various users' requirements for operations so as to be convenient for use and improve the user experience.

In addition, according to the embodiments of the present disclosure, the technical measure comprises: the first operation instruction specifically being a deletion instruction of deleting the N display objects, or a copy instruction of copying the N display objects, or a cut instruction of cutting the N display objects, or a share instruction of sharing the N display objects, or a selected state canceling instruction of canceling the selected state of the N display objects. In this way, the user can not only achieve an edition operation of display objects in one touch operation, but also can achieve an canceling operation without implementing other touch operations when the user wants to implement a canceling operation so as to simplify the operation.

BRIEF DESCRIPTION OF THE DRAWINGS

In order to illustrate technical solutions in the embodiments of the present disclosure or in the related art more clearly, accompanying drawings needed to be used in the description of the embodiments will be described below in brief. Obviously, the accompanying drawings described below are merely some embodiments of the present disclosure.

DETAILED DESCRIPTION

Figure 1:
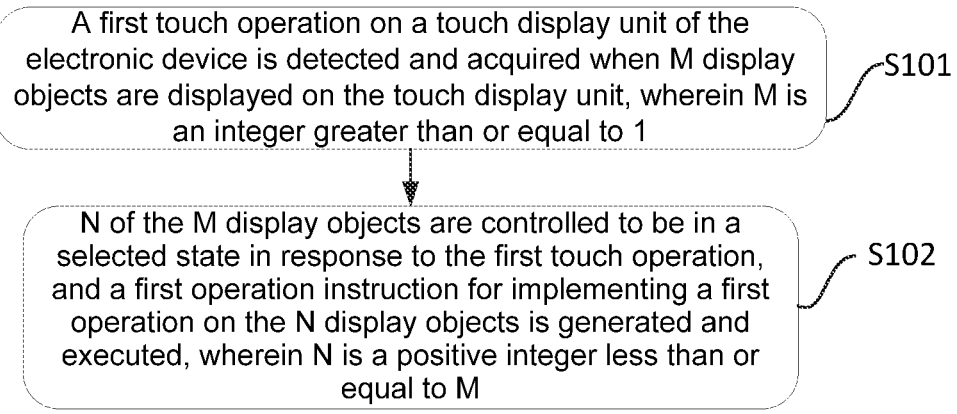
FIG. 1 is a flowchart of an information processing method according to an embodiment of the present disclosure.

The embodiments of the present disclosure provide an information processing method and an electronic device, to simplify the operation and improve the efficiency in the operation.

The general concept of the technical solutions according to the embodiments of the present application is as follows.

An information processing method may comprise:

detecting and acquiring a first touch operation on a touch display unit of the electronic device when M display objects are displayed on the touch display unit, wherein M is an integer greater than or equal to 1; and controlling N of the M display objects to be in a selected state in response to the first touch operation, and generating and executing a first operation instruction for implementing a first operation on the N display objects, wherein N is a positive integer less than or equal to M.

In the above technical solutions, the method comprises detecting and acquiring a first touch operation on a touch display unit of the electronic device when M display objects are displayed on the touch display unit, controlling N of the M display objects to be in a selected state in response to the first touch operation, and generating and executing a first operation instruction for implementing a first operation on the N display objects. In this way, when a touch operation is detected by the electronic device, the electronic device can not only select objects corresponding to the touch operation based on the touch operation, but also can implement other operations on the selected objects based on the first operation. This simplifies the process that an operation can only be completed if a selection operation is firstly implemented on some of display objects and then corresponding operation options are selected from an operation menu when said some display objects need to be edited. Therefore, the present disclosure may effectively simplify the operation and improve the efficiency in the operation.

In order to make the technical solutions, and advantages of the embodiments of the present disclosure more clear and obvious, the technical solutions according to the present disclosure will be clearly described below with reference to the drawings of the embodiments of the present disclosure. Obviously, the embodiments as described are merely a part of the embodiments in the technical solutions of the present disclosure. All other embodiments acquired by those skilled in the art based on the embodiments recited in the documents of the present disclosure without any creative effort should belong to the scope protected by the technical solutions of the present disclosure.

Before describing an information processing method according to the embodiments of the present disclosure in detail, an electronic device corresponding to the method will firstly be basically described. The electronic device according to the embodiments of the present disclosure may be a tablet computer, a touch screen mobile phone, or another electronic device having a touch unit. The touch unit may be a conventional hard touch screen, or may also be a flexible touch screen, which will not be limited in the embodiments of the present disclosure.

First Embodiment

In order to enable those skilled in the art to clearly understand the technical solution according to the embodiment of the present disclosure, the technical solution will be set forth in the following specific description by taking the electronic device being a tablet computer as an example. A specific implementation of the method according to the embodiment of the present disclosure will be described below by way of examples.

With reference to FIG. 1, illustrated is a flowchart of a specific implementation of an information processing method according to the first embodiment of the present disclosure. The method comprises the following steps:

In step S101, a first touch operation on a touch display unit of the electronic device is detected and acquired when M display objects are displayed on the touch display unit, wherein M is an integer greater than or equal to 1; and in step S102, N of the M display objects are controlled to be in a selected state in response to the first touch operation, and a first operation instruction for implementing a first operation on the N display objects is generated and executed, wherein N is a positive integer less than or equal to M.

In the first embodiment of the present disclosure, the first touch operation is specifically a touch operation implemented by an operation body on the touch display unit, and the operation body is specifically a finger of the user or a stylus. The M objects are file objects and/or application objects displayed on the touch display unit; or the M objects are characters and/or symbols displayed on the touch display unit after a text file is opened through a text application.

Specifically, by taking the electronic device being a tablet computer as an example, the first touch operation may be a touch operation implemented by the user on an application on a desktop of the tablet computer with a finger or a stylus on a screen of the tablet computer, or a touch operation implemented by the user on characters, symbols or the like in an opened word document with a finger or a stylus on the screen of the tablet computer, which will not be enumerated here.

When information is processed with the method according to the first embodiment of the present disclosure, step S101 is firstly performed, i.e., a first touch operation on a touch display unit of the electronic device is detected and acquired when M display objects are displayed on the touch display unit, wherein M is an integer greater than or equal to 1.

Figure 2:
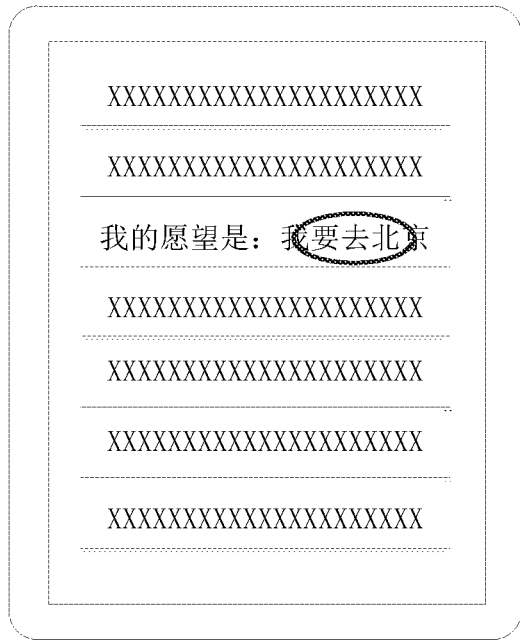
FIG. 2 is a diagram of a first specific implementation of step S101 in a first embodiment of the present disclosure.
Figure 3:
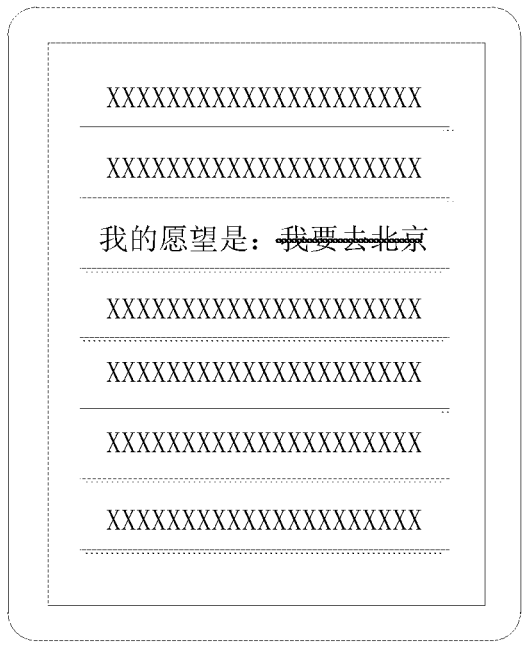
FIG. 3 is a diagram of a second specific implementation of step S101 in the first embodiment of the present disclosure.

In a specific implementation, by taking the electronic device being a tablet computer as an example, a user wants to implement a copy operation on characters in a word document. In this case, by taking the first touch operation being specifically a touch operation implemented by the user on characters in an opened word document with a stylus on a screen of the tablet computer as an example, when content of a word document is displayed on the screen and the user wants to edit "我要去北京" in the content of the document, a circle drawing operation may be implemented around "我要去北京", as shown in FIG. 2, or a transverse line drawing operation may also be implemented on "我要 去北京", as shown in FIG. 3. Then, the touch operation of the user is detected by a sensor of the screen of the tablet computer.

After step S101 is performed, step S102 is performed in the method according to the embodiment of the present disclosure, i.e., N of the M display objects are controlled to be in a selected state in response to the first touch operation, and a first operation instruction for implementing a first operation on the N display objects is generated and executed, wherein N is a positive integer less than or equal to M.

Figure 4:
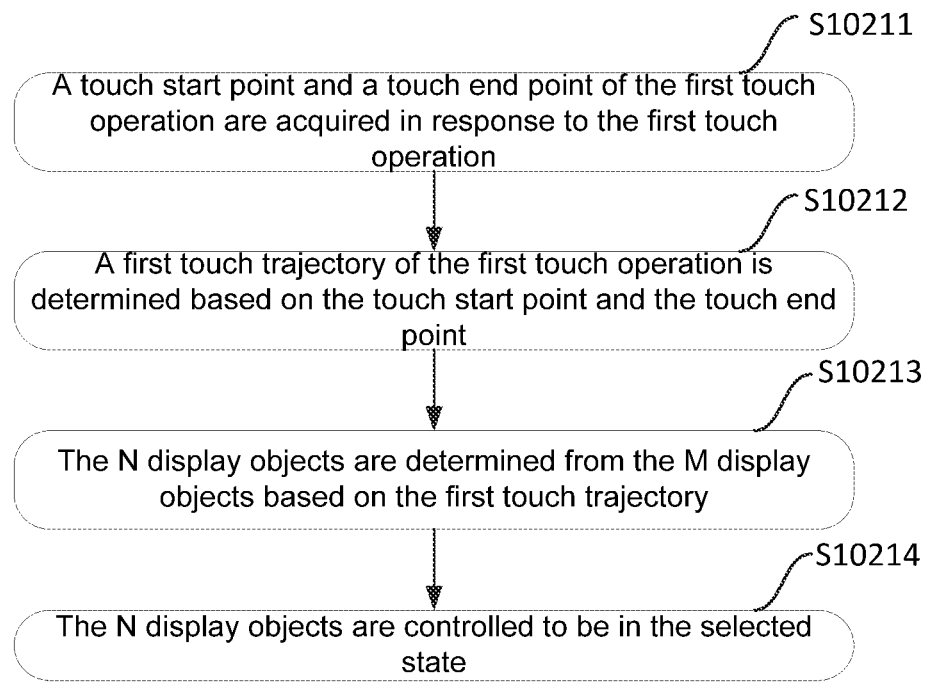
FIG. 4 is a flowchart of a specific implementation of a first step in step S102 in the first embodiment of the present disclosure.

In the embodiment of the present disclosure, step S102 may be divided into two steps. In a first step, N of the M display objects are controlled to be in a selected state in response to the first touch operation, and in a second step, a first operation instruction for implementing a first operation on the N display objects is generated and executed. With reference to FIG. 4, a specific implementation of the first step in the embodiment of the present disclosure comprises the following steps.

In S10211, a touch start point and a touch end point of the first touch operation are acquired in response to the first touch operation;

in S10212, a first touch trajectory of the first touch operation is determined based on the touch start point and the touch end point;

in S10213, the N display objects are determined from the M display objects based on the first touch trajectory; and in S10214, the N display objects are controlled to be in the selected state.

In a specific implementation, by still taking the above example, after the touch operation of the user is detected on the screen of the tablet computer, an operation start point and an operation end point of the touch operation are acquired. For example, when the touch operation is a circle drawing operation, the touch start point and the touch end point are at ⅓ of the character "我" from left to right, i.e., the operation start point is the same as the operation end point. When the touch operation is a transverse line drawing operation, the touch start point is at ½ of the character "我" from left to right, and the touch end point is at ¼ of the character "京" from left to right, i.e., the touch start point is at a distance from the touch end point.

After the step is performed, step S10212 is performed in the method according to the embodiment of the present disclosure, i.e., a first touch trajectory of the first touch operation is determined based on the touch start point and the touch end point.

Figure 5:
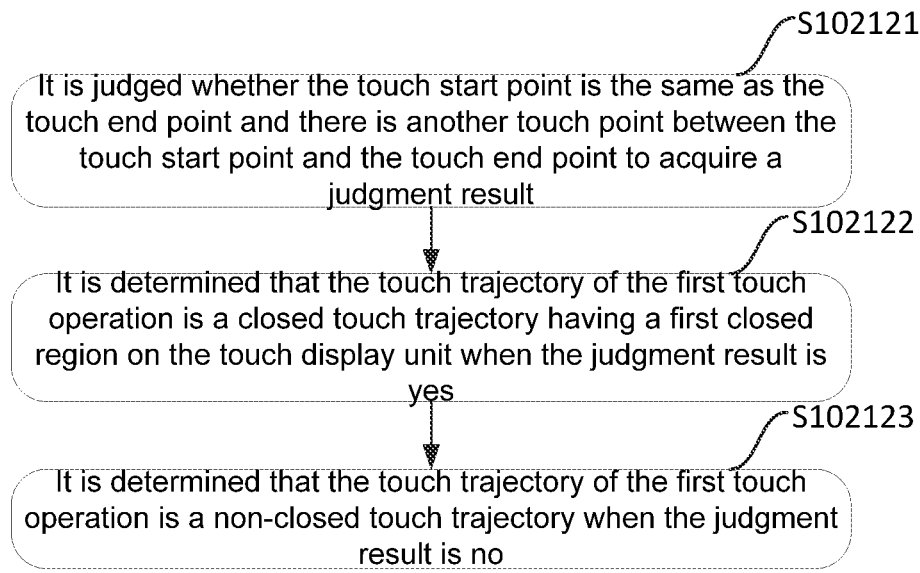
FIG. 5 is a flowchart of a specific implementation of step S10212 in the first embodiment of the present disclosure.

In the embodiment of the present disclosure, with reference to FIG. 5, a specific implementation of step S10212 comprises the following steps.

In S102121, it is judged whether the touch start point is the same as the touch end point and there is another touch point between the touch start point and the touch end point to acquire a judgment result;

in S102122, it is determined that the touch trajectory of the first touch operation is a closed touch trajectory having a first closed region on the touch display unit when the judgment result is yes; and in S102123, it is determined that the touch trajectory of the first touch operation is a non-closed touch trajectory when the judgment result is no.

In a specific implementation, by still taking the above example, the touch operation has been detected on the screen of the tablet computer. In this case, by taking the touch operation being a circle drawing operation as an example, as the touch start point and the touch end point are at ⅓ of the character "我" from left to right, the tablet computer judges that the touch start point and the touch end point of the touch operation are the same. Further, if it is judged that there is another touch point between the touch start point and the touch end point, for example, a touch point at the rightmost end of the trajectory of the circle drawing operation is at ½ of the character "京" from left to right, it is determined that the circle drawing touch operation forms a closed touch trajectory. Alternatively, by taking the touch operation being a transverse line drawing operation as an example, as the touch start point is at ½ of the character "我" from left to right and the touch end point is at ¼ of the character "京" from left to right, the tablet computer judges that the touch start point and the touch end point are not in the same position, and thus determines that the transverse line drawing touch operation forms a non-closed touch trajectory.

After step S10212 is performed, step S10213 is performed in the method according to the embodiment of the present disclosure, i.e., the N display objects are determined from the M display objects based on the first touch trajectory.

In the embodiment of the present disclosure, a specific implementation of step S10213 comprises:

determining the N display objects from the M display objects, wherein the N display objects at least comprise at least one of the M display objects which is located in the first closed region; or determining that at least one of the M display objects which is on the non-closed touch trajectory belongs to the N display objects.

In a specific implementation, by still taking the above example, when the tablet computer determines that the touch trajectory is a closed touch trajectory, it is determined that characters surrounded by the closed trajectory belong to the N display objects. In the specific implementation, a character surrounded by the closed trajectory is necessarily one of the N objects, such as three characters "要去北" illustrated in the figure. As for characters on the boundary of the trajectory, such as characters "我" and "京" illustrated in the figure, the tablet computer may be configured to determine that a character is one of the N objects only if the ⅔ of the character is surrounded by the closed trajectory. In this case, as the touch start point is at ⅓ of the character "我" from left to right, ⅔ of the character is necessarily surrounded by the closed region, and thus it is determined that "我" is one of the N objects. As the touch point at the rightmost end of the touch trajectory is at ½ of the character "京" from left to right, only ½ of the character "京" is surrounded by the closed region, and thus the character "京" is not one of the N objects. As a result, the tablet computer determines that the N objects are "我要去北". Of course, which character is one of the N objects may be set by those skilled in the art according to practical usage requirements, for example, it may be determined that any character on the touch trajectory is one of the N objects, which is not limited in the present disclosure.

When the tablet computer determines that the touch trajectory is a non-closed touch trajectory, the tablet computer may be configured to determine that any character on the touch trajectory is one of the N objects. As the touch start point is at ½ of the character "我" from left to right and the touch end point is at ¼ of the character "京" from left to right, characters on the touch trajectory are "我要去北京", and thus it is determined that the N objects are "我要 去北京". Of course, which character is one of the N objects may be set by those skilled in the art according to practical usage requirements, for example, it may be determined that a character is one of the N objects only if ½ of the character is surrounded by the touch trajectory, which is not limited in the present disclosure.

After step S10213 is performed, step S10214 is performed in the method according to the embodiment of the present disclosure, i.e., the N display objects are controlled to be in the selected state.

Figure 6:
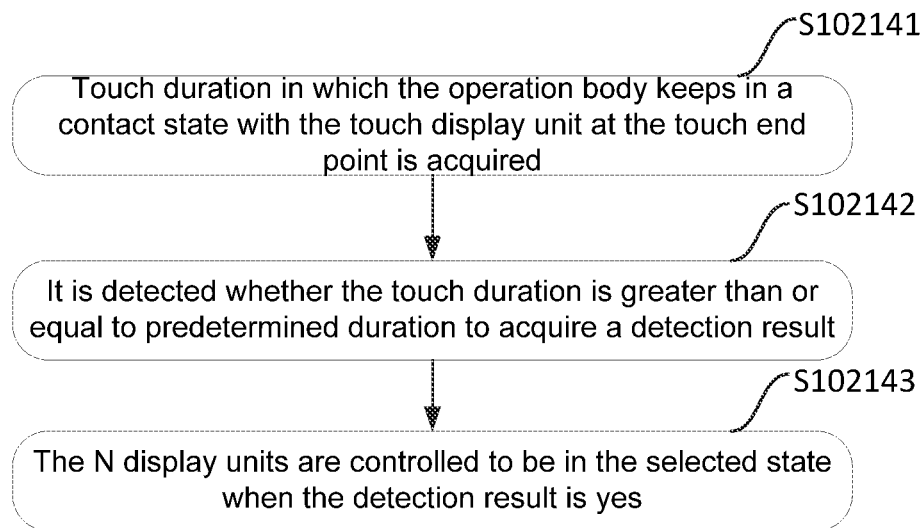
FIG. 6 is a flowchart of a specific implementation of step S10214 in the first embodiment of the present disclosure.

In the embodiment of the present disclosure, with reference to FIG. 6, a specific implementation of step S10214 comprises the following steps.

In S10241, touch duration in which the operation body keeps in a contact state with the touch display unit at the touch end point is acquired;

in S10242, it is detected whether the touch duration is greater than or equal to predetermined duration to acquire a detection result; and in S10243, the N display units are controlled to be in the selected state when the detection result is yes.

Figure 7:
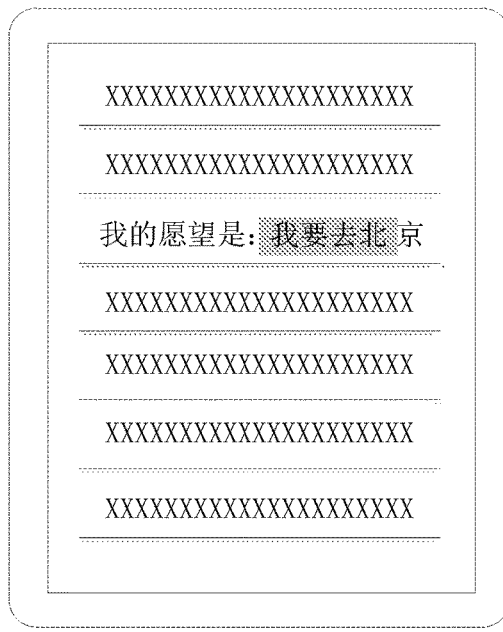
FIG. 7 is a diagram of a specific implementation of step S10214 in the first embodiment of the present disclosure.

In a specific implementation, by still taking the above example, after the N objects are determined through the touch trajectory, the tablet computer detects touch duration corresponding to the end point of the touch operation, for example, 2 s. Predetermined duration may be specifically set to for example 1s or 2 s by a user or those skilled in the art according to practical usage conditions. By taking the predetermined duration being 1 s as an example, the tablet computer judges that the touch duration 2 s of the touch end point is greater than 1 s, then selects the N objects "我要去北京" or "我要去北", and feeds the content of the characters which are currently selected back to the user on the screen of the tablet computer, for example, by adding a shadow on "我要 去北", as shown in FIG. 7, or changing a font color of "我要去北", which is not limited in the present disclosure.

Figure 8A:
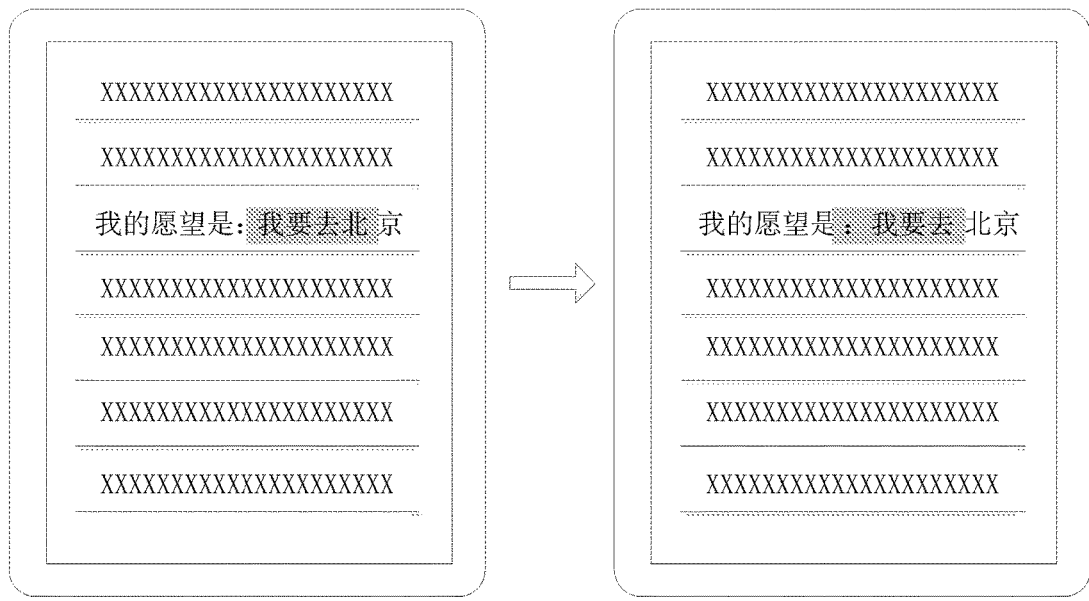
FIG. 8A is a diagram of moving a selected bar to the left according to the first embodiment of the present disclosure.
Figure 8B:
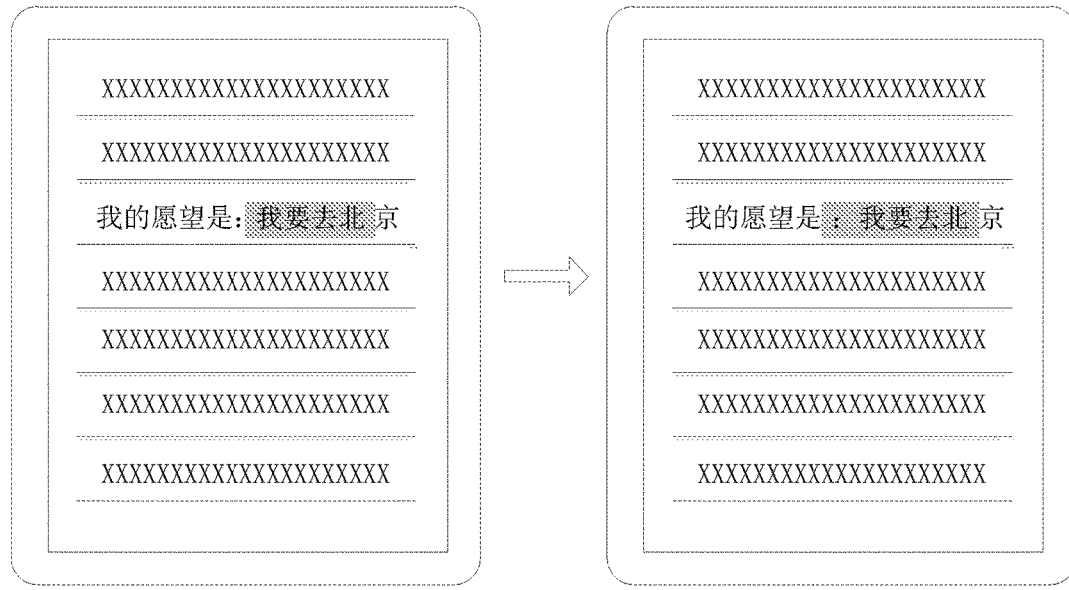
FIG. 8B is a diagram of adjusting a position of a leftmost end of a selected bar according to the first embodiment of the present disclosure.
Figure 9A:
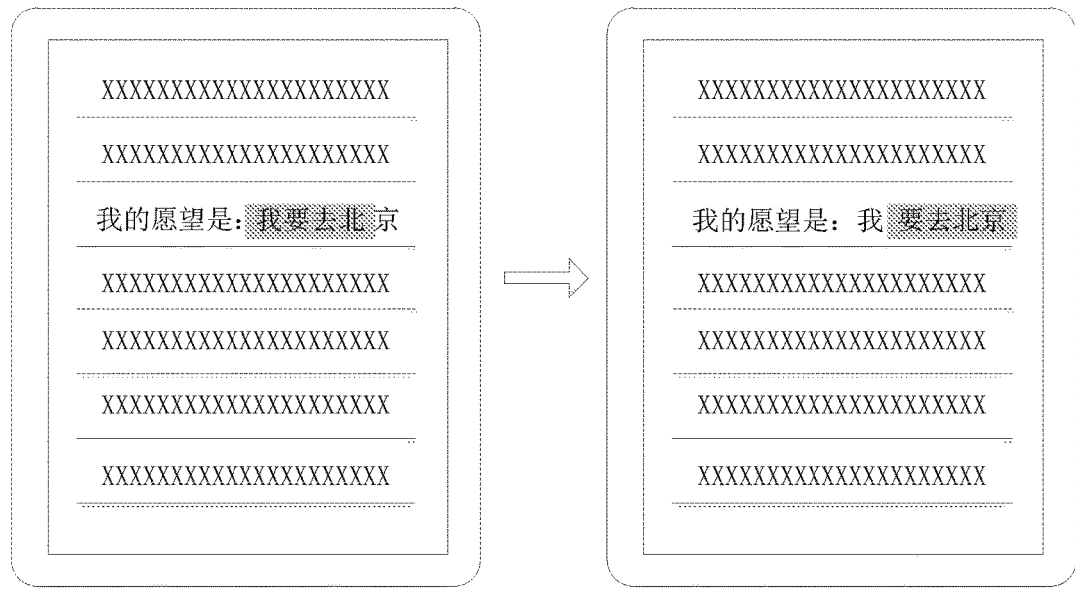
FIG. 9A is a diagram of moving a selected bar to the right according to the first embodiment of the present disclosure.
Figure 9B:
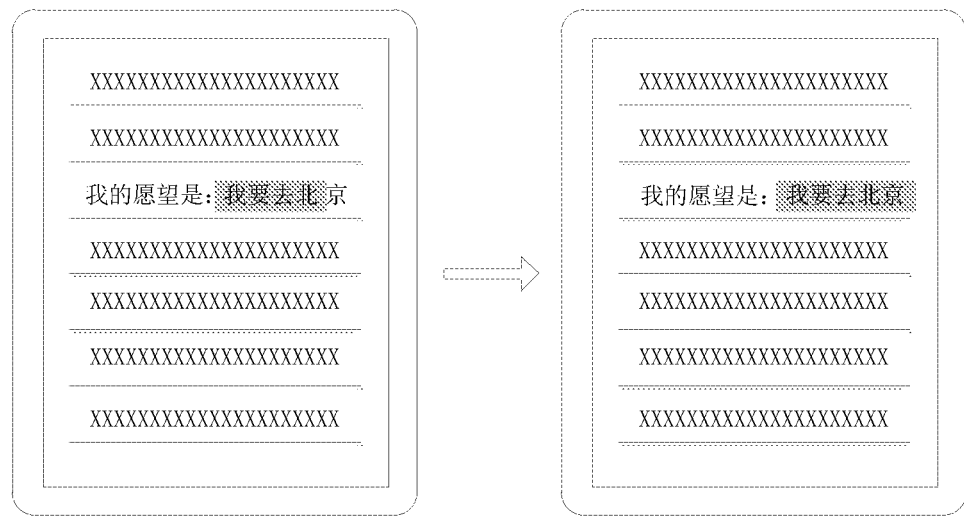
FIG. 9B is a diagram of adjusting a position of a rightmost end of a selected bar according to the first embodiment of the present disclosure.

After the N objects are selected by the tablet computer, before the stylus is lifted up, a touch operation of moving to the left or to the right in a position of the end point of the touch operation is further detected. By taking the touch operation being a circle drawing operation as an example, after the tablet computer selects "我要去北", the tablet computer detects a touch operation of moving to the left at the touch end point, i.e., there is a touch operation of moving a character to the left at ½ of the character "我" from left to right. In this case, the entire selected bar is moved by the tablet computer to the left for a distance of one character, and then ":我要去" are selected by the tablet computer, as shown in FIG. 8A; or the leftmost end of the selected bar is moved by the tablet computer to the left for a distance of one character, and then ":我 要 去 北" are selected by the tablet computer, as shown in FIG. 8B. Correspondingly, when it is detected that there is a touch operation of moving to the right at the touch end point, the entire selected bar is moved by the tablet computer to the right, and then "要去北京" are selected by the tablet computer, as shown in FIG. 9A; or the rightmost end of the selected bar is moved by the tablet computer to the right, and then " " are selected by the tablet computer, as shown in FIG. 9B. In a specific implementation, this may be set by those skilled in the art according to practical usage requirements, which is not limited in the present disclosure.

After the first step is performed, the second step is performed in the method according to the embodiment of the present disclosure, i.e., the first operation instruction for implementing a first operation on the N display objects is generated and executed.

In the embodiment of the present disclosure, as there may be different touch trajectories, the second step may be specifically implemented in the following two manners.

Figure 10:
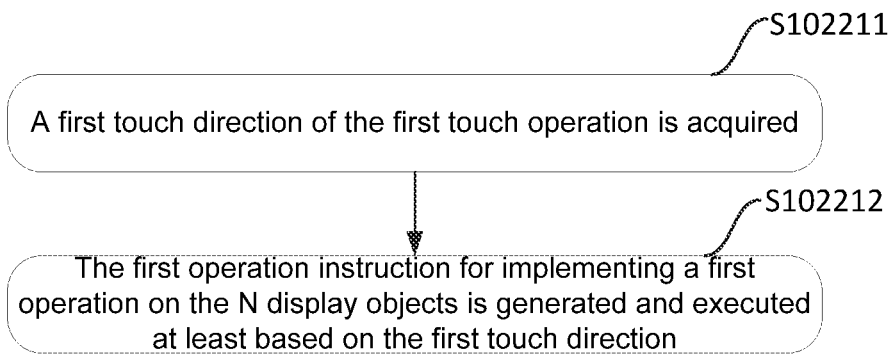
FIG. 10 is a flowchart of a specific implementation of a second step in step S102 according to the first embodiment of the present disclosure.

First Manner:

When the first touch trajectory is the closed touch trajectory, with reference to FIG. 10, the second step specifically comprises the following steps.

In S102211, a first touch direction of the first touch operation is acquired; and In S102212, the first operation instruction for implementing a first operation on the N display objects is generated and executed at least based on the first touch direction.

The first operation instruction is specifically:

a deletion instruction of deleting the N display objects; or a copy instruction of copying the N display objects; or a cut instruction of cutting the N display objects; or a share instruction of sharing the N display objects; or a selected state cancel instruction of cancel the selected state of the N display objects.

In a specific implementation, as the circle drawing trajectory is a trajectory from a touch start point "我" to a touch point "京" and then back to "我", the tablet computer judges that the direction of the trajectory is a clockwise direction. A user may preset an operation instruction corresponding to the direction of the trajectory in the tablet computer according to practical usage requirements, for example, a copy operation instruction corresponding to a clockwise circle drawing operation, a cut operation instruction corresponding to an anticlockwise circle drawing operation or the like. In the embodiment of the present disclosure, the operation instructions may comprise a deletion operation instruction, a copy operation instruction, a cut operation instruction, a share operation instruction, and a cancel operation instruction. Of course, there may be other operation instructions, which are not limited in the embodiment of the present disclosure. In this case, the tablet computer judges that the direction of the circle drawing trajectory is a clockwise direction, and determines that the operation instruction corresponding to the clockwise direction is a copy operation from the preset operation instructions. Then, the tablet computer generates an operation instruction of copying "我要去北". When the touch operation ends, the tablet computer achieves an operation of copying "我要去北". When the user implements a clockwise circle drawing operation on "我要去北", and does not want to implement any operation on the four characters before the stylus is lifted up, the user may implement a slide operation in an upward direction or a downward direction. When the tablet computer detects that the touch operation is an operation of firstly drawing a circle in a clockwise direction and then sliding at the end point of the circle in an upward direction or a downward direction, it is determined that the operation instruction corresponding to the current operation is an operation instruction of canceling a selected state of "我要去北".

Second Manner:

When the first touch trajectory is the non-closed touch trajectory, the second step specifically comprises:

generating and executing the first operation instruction for implementing a first operation on the N display objects based on the non-closed touch trajectory.

The first operation instruction is specifically:

a deletion instruction of deleting the N display objects; or a copy instruction of copying the N display objects; or a cut instruction of cutting the N display objects; or a share instruction of sharing the N display objects; or a selected state cancel instruction of cancel the selected state of the N display objects.

In a specific implementation, as the transverse line drawing trajectory is a trajectory from a character "我" at a touch start point to a character "京" at a touch end point in a rightward direction, the tablet computer judges that the direction of the trajectory is a left-to-right direction. A user may preset an operation instruction corresponding to the direction of the trajectory in the tablet computer according to practical usage requirements, for example, a copy operation instruction corresponding to a left-to-right transverse line drawing operation, a cut operation instruction corresponding to a right-to-left transverse line drawing operation or the like. In the embodiment of the present disclosure, the operation instructions may comprise a deletion operation instruction, a copy operation instruction, a cut operation instruction, a share operation instruction, and a cancel operation instruction. Of course, there may be other operation instructions, which are not limited in the embodiment of the present disclosure. In this case, the tablet computer judges that the direction of the transverse line drawing trajectory is a left-to-right direction, and determines that the operation instruction corresponding to the left-to-right direction is a copy operation from the preset operation instructions. Then, the tablet computer generates an operation instruction of copying "我要去北京". When the touch operation ends, the tablet computer achieves an operation of copying "我要去北京". When the user implements a left-to-right transverse line drawing operation on "我要去北京", and does not want to implement any operation on the five characters before the stylus is lifted up, the user may implement a slide operation in an upward direction or a downward direction. When the tablet computer detects that the touch operation is an operation of firstly drawing a transverse line in a left-to-right direction and then sliding at the end point of the transverse line in an upward direction or a downward direction, it is determined that the operation instruction corresponding to the current operation is an operation instruction of canceling a selected state of "我要去北京".

Second Embodiment

Figure 11:
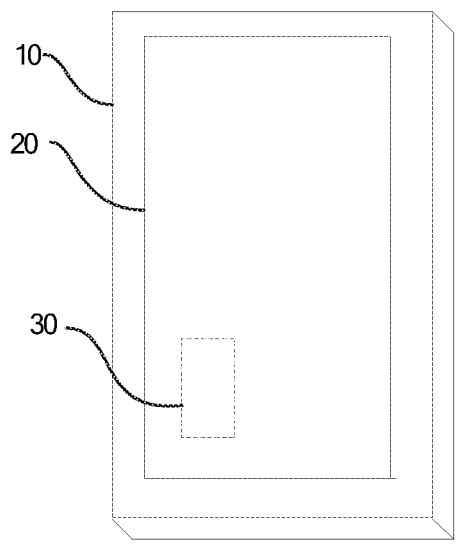
FIG. 11 is a structural diagram of an electronic device according to a second embodiment of the present disclosure.

With reference to FIG. 11, based on the same inventive concept as that of the first embodiment of the present disclosure, the second embodiment of the present disclosure provides an electronic device, comprising:

a housing 10;

a touch display unit 20 arranged in the housing 10; and a processor 30 arranged in the housing 10 and comprising hardware configured to detect and acquire a first touch operation on the touch display unit of the electronic device when M display objects are displayed on the touch display unit, wherein M is an integer greater than or equal to 1, control N of the M display objects to be in a selected state in response to the first touch operation, and generate and execute a first operation instruction for implementing a first operation on the N display objects, wherein N is a positive integer less than or equal to M.

Alternatively, in the second embodiment of the present disclosure, the hardware in the processor 30 is further configured to:

acquire a touch start point and a touch end point of the first touch operation in response to the first touch operation;

determine a first touch trajectory of the first touch operation based on the touch start point and the touch end point;

determine the N display objects from the M display objects based on the first touch trajectory; and control the N display objects to be in the selected state.

Alternatively, in the second embodiment of the present disclosure, the hardware in the processor 30 is further configured to:

acquire touch duration in which the operation body keeps in a contact state with the touch display unit at the touch end point;

detect whether the touch duration is greater than or equal to predetermined duration to acquire a detection result; and control the N display units to be in the selected state when the detection result is yes.

Alternatively, in the second embodiment of the present disclosure, the hardware in the processor 30 is further configured to:

judge whether the touch start point is the same as the touch end point and there is another touch point between the touch start point and the touch end point to acquire a judgment result;

determine that the touch trajectory of the first touch operation is a closed touch trajectory having a first closed region on the touch display unit when the judgment result is yes; and determine that the touch trajectory of the first touch operation is a non-closed touch trajectory when the judgment result is no.

Alternatively, in the second embodiment of the present disclosure, the hardware in the processor 30 is further configured to:

determine the N display units from the M display objects, wherein the N display objects at least comprise at least one of the M display objects which is located in the first closed region; or determine that at least one of the M display objects which is on the non-closed touch trajectory belongs to the N display objects.

Alternatively, in the second embodiment of the present disclosure, the hardware in the processor 30 is further configured to:

acquire a first touch direction of the first touch operation; and generate and execute the first operation instruction for implementing a first operation on the N display objects at least based on the first touch direction.

Alternatively, in the second embodiment of the present disclosure, the hardware in the processor 30 is further configured to:

generate and execute the first operation instruction for implementing a first operation on the N display objects based on the non-closed touch trajectory.

The electronic device described above corresponds to the information processing method according to the first embodiment one by one, and therefore will not be described in detail here.

Third Embodiment

Figure 12:
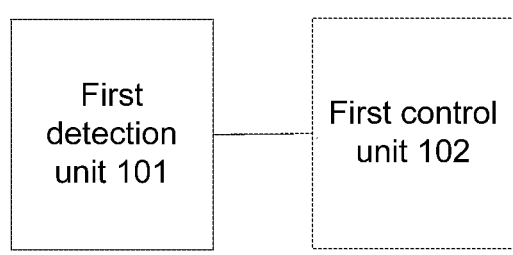
FIG. 12 is a structural block diagram of an electronic device according to a third embodiment of the present disclosure.

With reference to FIG. 12, based on the same inventive concept as that of the first embodiment of the present disclosure, the third embodiment of the present disclosure provides an electronic device, comprising:

a first detection unit 101 configured to detect and acquire a first touch operation on a touch display unit of the electronic device when M display objects are displayed on the touch display unit, wherein M is an integer greater than or equal to 1; and a first control unit 102 configured to control N of the M display objects to be in a selected state in response to the first touch operation, and generate and execute a first operation instruction for implementing a first operation on the N display objects, wherein N is a positive integer less than or equal to M.

In the third embodiment of the present disclosure, the first control unit 102 specifically comprises:

a first acquisition sub-unit configured to acquire a touch start point and a touch end point of the first touch operation in response to the first touch operation;

a first determination sub-unit configured to determine a first touch trajectory of the first touch operation based on the touch start point and the touch end point;

a second determination sub-unit configured to determine the N display objects from the M display objects based on the first touch trajectory; and a first control sub-unit configured to control the N display objects to be in the selected state.

In the third embodiment of the present disclosure, the first control sub-unit specifically comprises:

a first acquisition module configured to acquire touch duration in which the operation body keeps in a contact state with the touch display unit at the touch end point;

a first detection module configured to detect whether the touch duration is greater than or equal to predetermined duration to acquire a detection result; and a first control module configured to control the N display units to be in the selected state when the detection result is yes.

In the third embodiment of the present disclosure, the first determination sub-unit specifically comprises:

a first judgment module configured to judge whether the touch start point is the same as the touch end point and there is another touch point between the touch start point and the touch end point to acquire a judgment result;

a first determination module configured to determine that the touch trajectory of the first touch operation is a closed touch trajectory having a first closed region on the touch display unit when the judgment result is yes; and a second determination module configured to determine that the touch trajectory of the first touch operation is a non-closed touch trajectory when the judgment result is no.

In the third embodiment of the present disclosure, the second determination sub-unit specifically comprises:

a third determination module configured to determine the N display objects from the M display objects, wherein the N display objects at least comprise at least one of the M display objects which is located in the first closed region; or a fourth determination module configured to determine that at least one of the M display objects which is on the non-closed touch trajectory belongs to the N display objects.

In the third embodiment of the present disclosure, when the first touch trajectory is the closed touch trajectory, the first control unit 102 specifically comprises:

a second acquisition sub-unit configured to acquire a first touch direction of the first touch operation; and a first execution sub-unit configured to generate and execute the first operation instruction for implementing a first operation on the N display objects at least based on the first touch direction.

In the third embodiment of the present disclosure, when the first touch trajectory is the non-closed touch trajectory, the first control unit 102 specifically comprises:

a second execution sub-unit configured to generate and execute the first operation instruction for implementing a first operation on the N display objects based on the non-closed touch trajectory.

As the above electronic device corresponds to the information processing method in the first embodiment one by one, the electronic device will not be described in detail here.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, computer program instructions corresponding to the information processing method according to the embodiments of the present disclosure may be stored on a storage medium such as an optical disk, a hard disk, a USB device etc. When the computer program instructions in the storage medium corresponding to the information processing method are read or executed by an electronic device, the following steps are performed:

detecting and acquiring a first touch operation on a touch display unit of the electronic device when M display objects are displayed on the touch display unit, wherein M is an integer greater than or equal to 1; and controlling N of the M display objects to be in a selected state in response to the first touch operation, and generating and executing a first operation instruction for implementing a first operation on the N display objects, wherein N is a positive integer less than or equal to M.

Alternatively, when computer instructions stored in the storage medium, which correspond to the step of controlling N of the M display objects to be in a selected state in response to the first touch operation, are executed, the following steps are further performed:

acquiring a touch start point and a touch end point of the first touch operation in response to the first touch operation;

determining a first touch trajectory of the first touch operation based on the touch start point and the touch end point;

determining the N display objects from the M display objects based on the first touch trajectory; and controlling the N display objects to be in the selected state.

Alternatively, when computer instructions stored in the storage medium, which correspond to the step of controlling the N display objects to be in the selected state, are executed, the following steps are further performed:

acquiring touch duration in which the operation body keeps in a contact state with the touch display unit at the touch end point;

detecting whether the touch duration is greater than or equal to predetermined duration to acquire a detection result; and controlling the N display units to be in the selected state when the detection result is yes.

Alternatively, when computer instructions stored in the storage medium, which correspond to the step of determining a first touch trajectory of the first touch operation based on the touch start point and the touch end point, are executed, the following steps are further performed:

judging whether the touch start point is the same as the touch end point and there is another touch point between the touch start point and the touch end point to acquire a judgment result;

determining that the touch trajectory of the first touch operation is a closed touch trajectory having a first closed region on the touch display unit when the judgment result is yes; and determining that the touch trajectory of the first touch operation is a non-closed touch trajectory when the judgment result is no.

Alternatively, when computer instructions stored in the storage medium, which correspond to the step of determining the N display objects from the M display objects based on the first touch trajectory, are executed, the following steps are further performed:

determining the N display objects from the M display objects, wherein the N display objects at least comprise at least one of the M display objects which is located in the first closed region; or determining that at least one of the M display objects which is on the non-closed touch trajectory belongs to the N display objects.

Alternatively, when the first touch trajectory is the closed touch trajectory, when computer instructions stored in the storage medium, which correspond to the step of generating and executing a first operation instruction for implementing a first operation on the N display objects, are executed, the following steps are further performed:

acquiring a first touch direction of the first touch operation; and generating and executing the first operation instruction for implementing a first operation on the N display objects at least based on the first touch direction.

Alternatively, when the first touch trajectory is the non-closed touch trajectory, when computer instructions stored in the storage medium, which correspond to the step of generating and executing a first operation instruction for implementing a first operation on the N display objects, are executed, the following steps are further performed:

generating and executing the first operation instruction for implementing a first operation on the N display objects based on the non-closed touch trajectory.

Alternatively, when computer instructions stored in the storage medium, which correspond to the first operation instruction, are executed, the following steps are further performed:

a deletion instruction of deleting the N display objects; or
a copy instruction of copying the N display objects; or
a cut instruction of cutting the N display objects; or
a share instruction of sharing the N display objects; or
a selected state canceling instruction of canceling the selected state of the N display objects.

Although preferable embodiments of the present disclosure have been described, additional changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

We claim:
1. An information processing method, comprising:
detecting and acquiring a first touch operation on a touch display unit of the electronic device when M display objects are displayed on the touch display unit, wherein M is an integer greater than or equal to 1; and controlling N of the M display objects to be in a selected state in response to the first touch operation, wherein a first operation instruction for implementing a first operation on the N display objects is generated and executed based on a first touch direction of the first touch operation, wherein a second operation instruction for implementing a second operation on the N display objects is generated and executed based on a second touch direction of the first touch operation, wherein the first touch direction of the first touch operation is different from the second touch direction of the first touch operation, wherein the first operation instruction is different from the second operation instruction, wherein N is a positive integer less than or equal to M, and wherein each of the first and second operation instructions is one of a deletion instruction of deleting the N display objects, a copy instruction of copying the N display objects, a cut instruction of cutting the N display objects, or a share instruction of sharing the N display objects.

2. The method according to claim 1, wherein the first touch operation is specifically a touch operation implemented by an operation body on the touch display unit, and the operation body is specifically a finger of a user or a stylus.

3. The method according to claim 2, wherein controlling N of the M display objects to be in a selected state in response to the first touch operation comprises:
acquiring a touch start point and a touch end point of the first touch operation in response to the first touch operation;
determining a first touch trajectory of the first touch operation based on the touch start point and the touch end point;
determining the N display objects from the M display objects based on the first touch trajectory; and
controlling the N display objects to be in the selected state.

4. The method according to claim 3, wherein controlling the N display objects to be in the selected state comprises:
acquiring a touch duration in which the operation body keeps in a contact state with the touch display unit at the touch end point;
detecting whether the touch duration is greater than or equal to predetermined duration to acquire a detection result; and
controlling the N display units to be in the selected state when the detection result is yes.

5. The method according to claim 4, wherein determining a first touch trajectory of the first touch operation based on the touch start point and the touch end point comprises:
judging whether the touch start point is the same as the touch end point and there is another touch point between the touch start point and the touch end point to acquire a judgment result; and
determining that the touch trajectory of the first touch operation is a closed touch trajectory having a first closed region on the touch display unit when the judgment result is yes, and determining that the touch trajectory of the first touch operation is a non-closed touch trajectory when the judgment result is no.

6. The method according to claim 5, wherein determining the N display objects from the M display objects based on the first touch trajectory comprises:

determining the N display objects from the M display objects, wherein the N display objects at least comprise at least one of the M display objects which is located in the first closed region, or
determining that at least one of the M display objects which is on the non-closed touch trajectory belongs to the N display objects.

7. The method according to claim 1, further comprising:
generating and executing a second operation instruction for implementing a second operation on the N display objects based on a second touch direction after the first touch direction of the first touch operation, wherein the second operation instruction is an instruction to cancel the selected state of the N display objects.

8. An electronic device, comprising:
a housing;
a touch display unit arranged in the housing; and
a processor arranged in the housing and comprising hardware configured to detect and acquire a first touch operation on the touch display unit of the electronic device when M display objects are displayed on the touch display unit, wherein M is an integer greater than or equal to 1, control N of the M display objects to be in a selected state in response to the first touch operation, wherein a first operation instruction for implementing a first operation on the N display objects is generated and executed based on a first touch direction of the first touch operation, wherein a second operation instruction for implementing a second operation on the N display objects is generated and executed based on a second touch direction of the first touch operation, wherein the first touch direction of the first touch operation is different from the second touch direction of the first touch operation, wherein the first operation instruction is different from the second operation instruction, wherein N is a positive integer less than or equal to M, and wherein each of the first and second operation instructions is one of a deletion instruction of deleting the N display objects, a copy instruction of copying the N display objects, a cut instruction of cutting the N display objects, or a share instruction of sharing the N display objects.

9. The electronic device according to claim 8, wherein the hardware is further configured to:
acquire a touch start point and a touch end point of the first touch operation in response to the first touch operation;
determine a first touch trajectory of the first touch operation based on the touch start point and the touch end point;
determine the N display objects from the M display objects based on the first touch trajectory; and
control the N display objects to be in the selected state.

10. The electronic device according to claim 9, wherein the hardware is further configured to:
acquire a touch duration in which the operation body keeps in a contact state with the touch display unit at the touch end point;
detect whether the touch duration is greater than or equal to predetermined duration to acquire a detection result; and
control the N display units to be in the selected state when the detection result is yes.

11. The electronic device according to claim 10, wherein the hardware is further configured to:

judge whether the touch start point is the same as the touch end point and there is another touch point between the touch start point and the touch end point to acquire a judgment result;

determine that the touch trajectory of the first touch operation is a closed touch trajectory having a first closed region on the touch display unit when the judgment result is yes; and determine that the touch trajectory of the first touch operation is a non-closed touch trajectory when the judgment result is no.

12. The electronic device according to claim 11, wherein the hardware is further configured to:

determine the N display units from the M display objects, wherein the N display objects at least comprise at least one of the M display objects which is located in the first closed region; or determine that at least one of the M display objects which is on the non-closed touch trajectory belongs to the N display objects.

13. An electronic device, comprising:

a processor comprising hardware configured to detect and acquire a first touch operation on a touch display unit of the electronic device when M display objects are displayed on the touch display unit, wherein M is an integer greater than or equal to 1; and control N of the M display objects to be in a selected state in response to the first touch operation, wherein a first operation instruction for implementing a first operation on the N display objects is generated and executed based on a first touch direction of the first touch operation, wherein a second operation instruction for implementing a second operation on the N display objects is generated and executed based on a second touch direction of the first touch operation, wherein the first touch direction of the first touch operation is different from the second touch direction of the first touch operation, wherein the first operation instruction is different from the second operation instruction, wherein N is a positive integer less than or equal to M, and wherein each of the first and second operation instructions is one of a deletion instruction of deleting the N display objects, a copy instruction of copying the N display objects, a cut instruction of cutting the N display objects, or a share instruction of sharing the N display objects.

\* \* \* \* \*